(12) United States Patent
Nair et al.

(10) Patent No.: US 9,825,322 B2
(45) Date of Patent: Nov. 21, 2017

(54) GRID-SCALE SOLID STATE ELECTROCHEMICAL ENERGY STORAGE SYSTEMS

(71) Applicant: HiFunda LLC, Salt Lake City, UT (US)

(72) Inventors: Balakrishnan Nair, Salt Lake City, UT (US); Jesse Alan Nachlas, Salt Lake city, UT (US)

(73) Assignee: HiFunda LLC, Salt Lake City, UT (US)

( * ) Notice: Subject to any disclaimer, the term of this patent is extended or adjusted under 35 U.S.C. 154(b) by 229 days.

(21) Appl. No.: 14/656,504

(22) Filed: Mar. 12, 2015

(65) Prior Publication Data
US 2015/0263557 A1 Sep. 17, 2015

Related U.S. Application Data

(60) Provisional application No. 61/951,621, filed on Mar. 12, 2014.

(51) Int. Cl.
*H02J 7/00* (2006.01)
*H01M 8/18* (2006.01)

(52) U.S. Cl.
CPC .... *H01M 8/184* (2013.01); *H01M 2300/0074* (2013.01); *Y02E 60/528* (2013.01)

(58) Field of Classification Search
CPC .......... H01M 2300/0074; H01M 8/184; Y02E 60/528
USPC ........................................................ 320/107
See application file for complete search history.

(56) References Cited

U.S. PATENT DOCUMENTS

| | | | | |
|---|---|---|---|---|
| 2009/0189445 A1* | 7/2009 | Strizki | .................... | H02J 3/382 307/21 |
| 2010/0151336 A1* | 6/2010 | Nakanishi | ............... | H01M 6/14 429/407 |
| 2011/0070506 A1* | 3/2011 | Friesen | ............. | H01M 8/04873 429/404 |
| 2012/0129058 A1* | 5/2012 | Litzinger | .............. | H01M 12/08 429/403 |

(Continued)

FOREIGN PATENT DOCUMENTS

WO 2013143921 10/2013
WO WO2013143921 * 10/2013

OTHER PUBLICATIONS

Machine English Translation of WO2013143921, 6 pages.*

(Continued)

*Primary Examiner* — Nathaniel Pelton
(74) *Attorney, Agent, or Firm* — Kunzler Law Group

(57) ABSTRACT

A method facilitates storing and discharging renewable energy. The method includes applying an electrical potential across a membrane comprising an oxygen ion conducting material during an energy storage cycle, transporting oxygen through the membrane to move oxygen from ambient air to a storage chamber during the energy storage cycle, subsequent to the energy storage cycle, applying an oxygen partial pressure differential across the membrane during an energy discharge cycle, transporting oxygen ions in an opposite direction through the membrane during the energy discharge cycle; and generating an electric current in at least one electrical circuit electrically connected to the membrane during the energy discharge cycle.

20 Claims, 6 Drawing Sheets

(56) References Cited

U.S. PATENT DOCUMENTS

| | | |
|---|---|---|
| 2013/0115528 A1 | 5/2013 | Lu |
| 2013/0337348 A1 | 12/2013 | Zheng |
| 2013/0344401 A1 | 12/2013 | Albertus et al. |
| 2014/0049109 A1* | 2/2014 | Kearns .................. H02J 3/00 307/52 |

OTHER PUBLICATIONS

Copenheaver et al. "International Search Report" for PCT Application No. PCT/US2015/020272, dated Jun. 15, 2015, 2 pages.
Copenheaver et al. "Written Opinion of the International Searching Authority" for PCT Application No. PCT/US2015/020272 dated Jun. 15, 2015, 7 pages.

* cited by examiner

US 9,825,322 B2

GRID-SCALE SOLID STATE ELECTROCHEMICAL ENERGY STORAGE SYSTEMS

CROSS-REFERENCE TO RELATED APPLICATIONS

This application claims the benefit of U.S. Provisional Application No. 61/951,621, filed on Mar. 12, 2014, entitled "Grid-Scale Solid State Electrochemical Energy Storage Systems" which is incorporated by reference herein in its entirety.

BACKGROUND

A number of industry drivers including increased deployment of renewable energy generation, costs for managing grid peak demands, capital investments in grid infrastructure for reliability and smart grid initiatives are creating renewed interest in electric energy storage systems. There is no energy storage technology today that can provide all of the requirements for high-amperage, large scale energy storage systems for wide-spread non-geography specific use.

While many technologies are in the research phase, the only conventional energy storage technology expected to be commercially viable today is hydro storage, especially via dam up-rating, and underground pumping. However, very high initial costs and poor scalability makes pumped hydro suitable only at some specific locations.

SUMMARY

Embodiments of systems and devices are described. In one embodiment, an apparatus includes an electrical energy storage device. An embodiment of the electrical energy storage device includes a membrane comprising an oxygen ion conducting material. The device also includes an electrical circuit coupled to electrodes of the membrane. The electrical circuit is configured to operate in at least two modes. A first mode is an energy storage mode, and a second mode is an energy discharge mode. The membrane is configured in the energy storage mode to transport oxygen ions through the membrane in a first direction from ambient air to a storage chamber in response to an electrical potential applied across the membrane. The membrane is configured in the energy discharge mode to transport oxygen ions through the membrane in an opposite direction to generate electrical current and make the electrical current available to the electrical circuit in response to an oxygen partial pressure differential applied across the membrane. Other embodiments of systems and devices are also described.

Embodiments of a method are also described. In one embodiment, the method is a method for and discharging renewable energy. The method includes applying an electrical potential across a membrane comprising an oxygen ion conducting material during an energy storage cycle. The method also includes transporting oxygen through the membrane to move oxygen from ambient air to a storage chamber during the energy storage cycle. The method also includes applying an oxygen partial pressure differential across the membrane during an energy discharge cycle. The method also includes transporting oxygen ions in an opposite direction through the membrane during the energy discharge cycle. The method also includes generating an electric current in at least one electrical circuit electrically connected to the membrane during the energy discharge cycle. In another embodiment, the method also includes supplying electrical energy from the electrical circuit to an electrical utility grid for transmission and consumption. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1A:
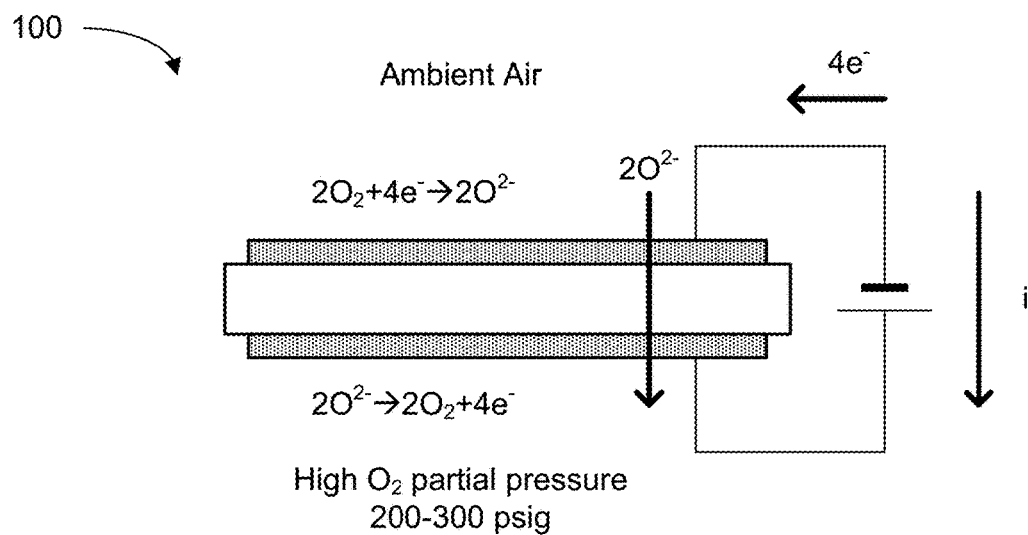
FIG. 1A depicts a schematic diagram of one embodiment of an electrochemical oxygen ion conducting membrane (ICM) for use in an energy storage cycle of an energy storage system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Typical requirements for a new technology that can find wide-spread use in a variety of locations globally include sufficiently low costs (target less than $100/kwh), high efficiency (>90%), sufficiently high power density, adequate reliability and lifetime (25,000 start-up shut down cycles), long discharge cycles (3-4 hours), no heavy construction requirements, no water disposal issues, and non-requirement of any supply-limited consumables or fuels. There is still a clear need and significant opportunity for a new energy storage technology that can meet these requirements.

A new technology proposed herein has the potential to meet all of these requirements for an ideal system. Embodiments described herein are based on solid-state electrochemical oxygen pumping technology for high oxygen pressure energy storage ("HOPES"). In comparison to other energy storage mechanisms being explored, the HOPES system is fundamentally different in the mechanism of energy storage (i.e., electrochemically pumped oxygen storage). It is widely scalable from watts to mega-watts, needs only air (i.e., oxygen from air) to operate and no other consumables, has the potential to deliver cycle efficiencies of over 90%, very high number of charge/discharge cycles (25,000 or higher) and can have costs under $100/kWh. Embodiments of this type of technology directly address sustainable technologies for energy efficiency, capture, storage and use, as it is aimed at a novel technology for the storage and use of energy from renewable sources, and use an electrochemical approach to increase the storage capacity relative to conventional technologies.

The HOPES technology is fundamentally different from other energy storage technologies in development and represents a transformational, rather than incremental innovation. A comparison with other energy storage technologies is provided below. The feasibility of the concept may be demonstrated through detailed electrochemical and thermomechanical modeling combined with bench-scale demonstration of sub-scale systems using tubular membranes. In one embodiment, the device may include a bundled tube HOPES 1 kW module, including solutions to address several unique requirements for the system that are not necessarily common to other similar systems such as solid oxide fuel cells or ion transport membranes for oxygen separation.

The HOPES technology builds on two decades of innovation in electrochemical ceramics for other applications such as industrial-scale oxygen production and solid oxide fuel cells (SOFCs) using ion conducting membranes (ICMs). These applications have pushed the performance and reduced the cost of ceramic membrane electrolyte technology to the point where the technology is viable or close to viable for incorporation into the HOPES application, especially considering that the operating conditions and performance requirements for the membrane electrolytes in the HOPES application are less demanding and less price sensitive compared to either of these applications.

The most widely-studied application of solid-state oxygen ion conductors is industrial-scale oxygen production both for bottled oxygen supply and for consumption in industrial operations. The US DOE and DoD (Air Force) have funded major research efforts over more than a decade in the general technology area of solid-state ionic conductors for oxygen production, with Air Products and Chemicals, Inc. (APCI) and Praxair, Inc. playing major roles.

Within the ICM technology development effort has been directed at electrically driven oxygen separation using solid electrolyte oxygen separation (SEOS, funded by the Air Force) systems using dense oxygen ion conductors, pressure-driven oxygen separation using dense mixed electrolyte oxygen separation (referred to as the "MEOS" program) and chemical oxygen gradient driven oxygen supply for syngas production (syngas). SEOS stacks have been operated for over 6,500 hours with no significant degradation in performance and have shown ASRs as low as 0.6 Ohm-cm$^2$ at 700° C. Limited work has been carried out to pressurize SEOS stacks up to about 10 psig. MEOS-oxygen stacks have been shown to operate at air pressures up to 200-300 psig. SOFCs represent a very similar, but much more aggressive application for solid state oxygen ion conductors due to the fact that one side of the SOFC membrane sees a strongly reducing environment with hydrogen or reformate, and the other side is air (which presents the need to make co-fired cells with very different electrode and electrolyte materials stable in these different environments).

As an example, some groups have demonstrated over 12,000 hours of continuous operation with no degradation in performance, and have demonstrated area specific resistance (ASR) under 0.4 Ohm-cm$^2$ at 800° C.

While the current industry teams are focused on planar designs, previous SECA-funded programs have also established a technology base for tubular designs. Through the SECA program, Siemens-Westinghouse has developed a seal-less, cathode supported tubular SOFC and demonstrated lifetime of >60,000 operating hours with voltage degradation rates<0.1% per 1000 hours. While some effort has gone into making pressurized SOFCs, especially in the tubular configuration, the driving force to go to higher operating pressures has been limited, primarily because the incremental benefits may not justify the added capital cost for SOFCs.

Embodiments described herein offer the potential to leverage the innovations made for solid state electrochemical systems for these applications and apply them to an environment that is less challenging in some ways than those that some of the thin dense ceramic membranes used for oxygen production and SOFCs were designed for, while demonstrating innovative designs that will help new requirements such as high pressure differentials across the membranes.

Embodiments of the HOPES system utilize dense, solid-state electrochemical oxygen ion conducting membranes (ICMs) for oxygen pumping. The electrical energy is stored in the form of electrochemical potential energy by electrochemically pumping oxygen from the ambient air and storing it in a pressurized chamber. In times of low electricity demand, a set of ICM-based stacks will utilize the excess electricity to pump oxygen from fan-blown ambient air into a pressurized oxygen tank at several hundred pounds per square inch (psi). During times of high demand, the stacks can act as a power source with an electrochemical driving potential due to the difference in oxygen partial pressure across the ICM between the high pressure oxygen in the tank and low pressure air (fan turns off, vacuum pump turns on).

Figure 1B:
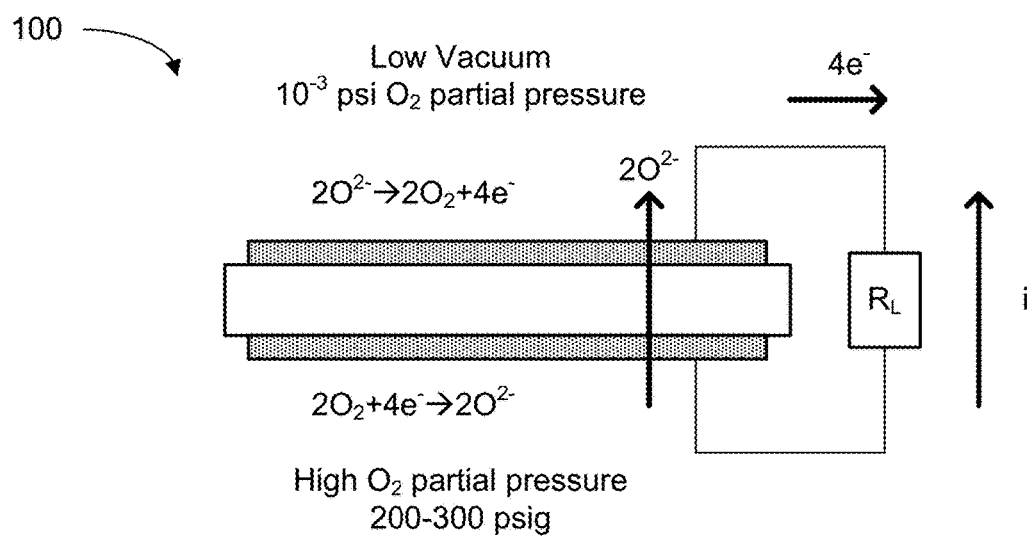
FIG. 1B depicts a schematic diagram of another embodiment of the electrochemical oxygen ICM of FIG. 1A for use in an energy discharge cycle of the energy storage system.

In one embodiment, the process/chemical reactions of the energy/oxygen storage cycle and the electrical energy production cycle are illustrated in FIGS. 1(a) and 1(b) respectively. Specifically, FIG. 1A depicts a schematic diagram of one embodiment of an electrochemical oxygen ion conducting membrane (ICM) 100 for use in an energy storage cycle of an energy storage system (see FIG. 2). FIG. 1B depicts a schematic diagram of another embodiment of the electrochemical oxygen ICM 100 of FIG. 1A for use in an energy discharge cycle of the energy storage system.

In the illustrated energy storage cycle of FIG. 1A, during periods of low electricity demand on the grid a DC voltage (typically 0-2.0 Volts) is applied across a solid-state oxygen ion conductor that can electrochemically pump oxygen across a dense ceramic membrane. In one embodiment, the oxygen will be electrochemically pumped from low-pressure ambient air into a pressurized chamber that contains oxygen at a high partial pressure during this storage cycle. In another embodiment the high pressure tank may be a mixture of an inert gas (e.g., nitrogen, argon, etc.) and oxygen. The voltage/current relationship for this step is indicated by Equation 1:

$$V_{app} = V_{HP,p(s)} + V_{LP,p(s)} + RT \, Ln(P_{O2,HP,s}/P_{O2,LP,s}) + I_p R_{i,m} \quad (1)$$

Where $V_{app}$ is the applied electric potential across the membrane in the storage cycle, $V_{HP,p(s)}$ and $V_{LP,p(s)}$ are the polarization potentials at the high-pressure and low pressure side during the storage cycle, R is the universal gas constant (8.314 J/mol/K), T is the absolute temperature (in Kelvin), $P_{O2,HP,s}$ and $P_{O2,LP,s}$ are the partial pressure of oxygen at the high-pressure electrode (anode during the storage cycle) and the low pressure electrode (cathode during the storage cycle) respectively, $I_p$ is the pump current and $R_{i,m}$ is the internal resistance of the membrane.

At times of high demand, the electrical circuit can be switched as shown in FIG. 1B to make the cell act as a power source driven by the electrochemical potential generated by the partial pressure gradient across the membrane between the high pressure stored oxygen and the ambient air side. The cell open circuit voltage (OCV) can be increased by using a low intensity vacuum pump on the air side which operated during the energy production cycle and can draw the partial pressure of oxygen on that side down to $10^{-2}$ to $10^{-3}$ psig. The OCV (Voc) is:

$$V_{OC} = RT \, Ln(P_{O2,HP,s}/P_{O2,LP,s}) \quad (2)$$

The extractable current, IL, in closed circuit generated by this cell across a load resistor, RL is related to VOC as $$IL = V_{OC}/(Ri_{,m} + R_L) \quad (3)$$

Figure 2:
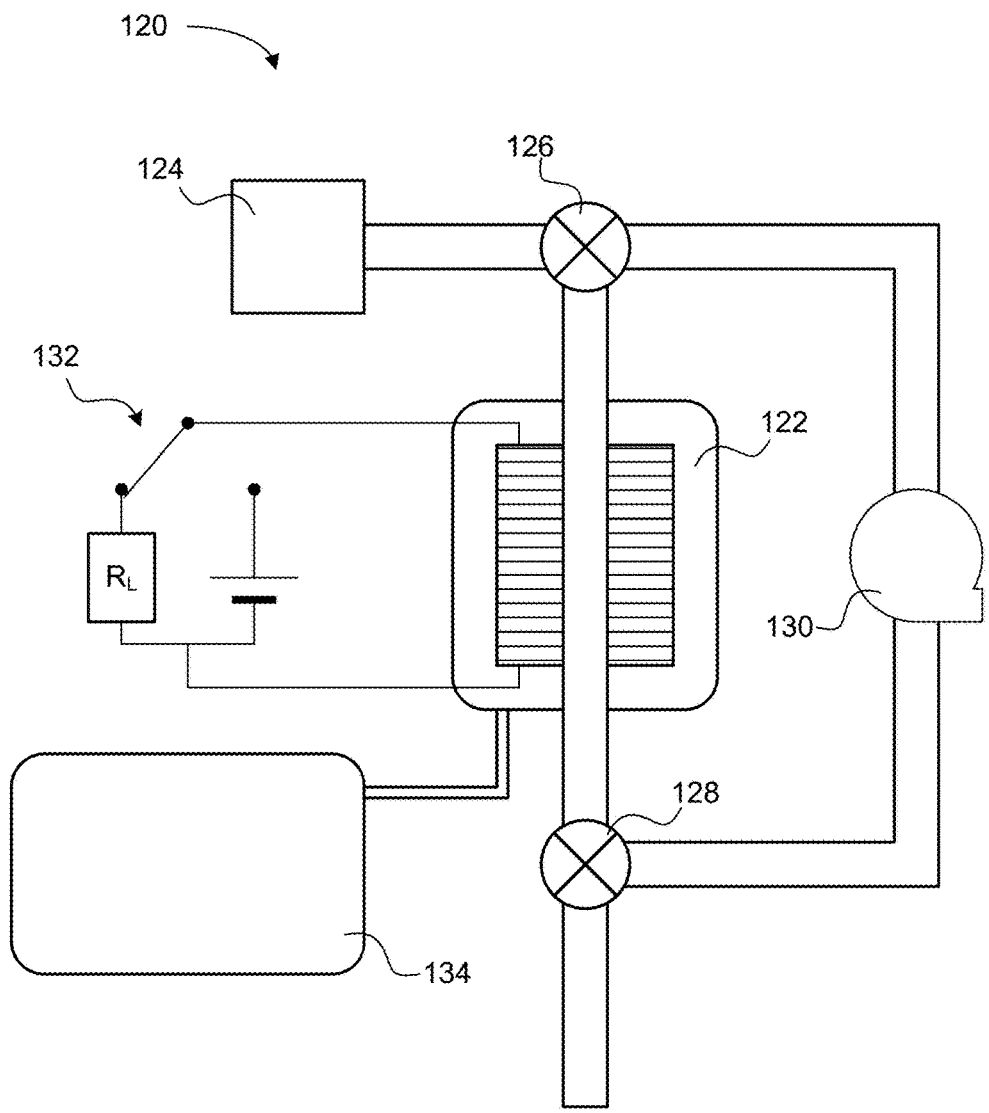
FIG. 2 depicts a schematic diagram of one embodiment of an energy storage system for implementation of the electrochemical oxygen ICM of FIGS. 1A and 1B.

FIG. 2 depicts a schematic diagram of one embodiment of an energy storage system for implementation of the electrochemical oxygen ICM of FIGS. 1A and 1B. This shows the relationship between an electrochemical oxygen generator 122 and the balance of the system. In one embodiment, an air pump 124 is connected to the low pressure side of the electrochemical oxygen pump 122 in order to provide a continuous supply of fresh oxygen containing air to the cathode reaction site at the electrode-electrolyte interface during the charging cycle. In some embodiments, there are two or more valves 126 and 128 coupled with the air pump that are configured such that during the charging cycle new fresh oxygen containing air can be continuously supplied to the air electrode.

In one embodiment, this air supply system also has a vacuum pump 130 that works in conjunction with the air pump 124 and the valves 126 and 128, one of which is a 3-way valve 126 that switches the gas connection from the air pump 124 to the vacuum pump 130. In this embodiment, during the discharge cycle the exit side valve 128 is placed in the closed position and the 3-way valve 126 is configured such that the air pump 124 is no longer supplying oxygen containing air to the electrode reaction site. Instead, with the valves 126 and 128 in these positions the vacuum pump 130 is energized to the on position such that it draws the oxygen away from the anode electrode/electrolyte interface during the discharge cycle. In some embodiments, this results in higher efficiency energy storage by increasing the driving force during the discharge cycle. In one embodiment, the vacuum pump 130 maintains an oxygen partial pressure at the anode during the discharge cycle in the range of $10^{-1}$ to $10^{-6}$ atm, and more specifically in the range of $10^{-2}$ to $10^{-3}$ atm. Other embodiments may use different ranges during the discharge cycle.

In the energy discharge cycle, electricity generated by the electrochemical oxygen pump 122 can be directed to a load within an associated electrical circuit 132. Alternatively, in the energy storage cycle, the electrical circuit 132 supplies electrical energy to the electrochemical oxygen pump 122 in order to electrochemically pump oxygen from the ambient air and store it in a pressurized chamber 134.

Overall efficiency of embodiments of the system 120 may be affected by electrical energy input requirements for maintaining the temperature of the system within the desired limits where the membrane has sufficient conductivity to initiate oxygen ion pumping, the resistive heat generated by the membrane (some of which may be useful for local heating), electrical energy required for the air blower 124 in the storage cycle, electrical energy required for the vacuum pump 130 in the electric power supply cycle, energy to pre-heat the air, and the heat energy absorbed/released by the compressed oxygen.

Figure 3A:
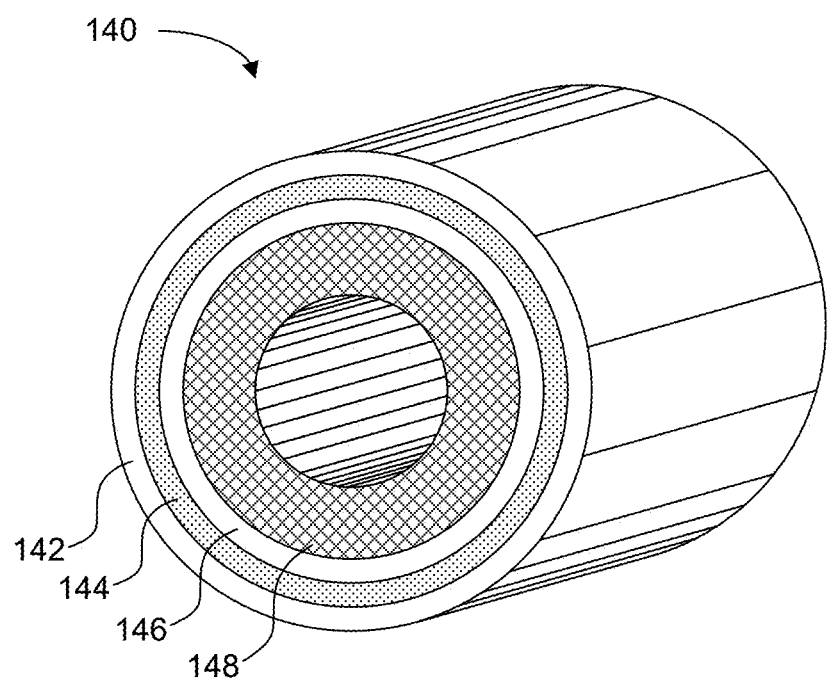
FIG. 3A depicts a schematic diagram of one embodiment of a tubular design for the electrochemical oxygen pump of FIG. 2.

In some embodiments, supported tubular membranes are an attractive design for this application. FIG. 3A depicts a schematic diagram of one embodiment of a tubular design 140 for the electrochemical oxygen pump of FIG. 2. Although a tubular design is shown and described herein, other embodiments may utilize different shapes, geometries, sizes, etc. for one or more electrochemical oxygen pumps.

The illustrated tubular design 140 includes four concentrically disposed layers, namely, an outer electrode 142, an oxygen ion conducting membrane 144, an inner electrode 146, and a porous support tube 148. In one embodiment, thin dense ion-conducting membranes 142 of thickness 10-100 μm are fabricated on porous ceramic tubes 148 of the same composition, thereby maintaining the high pressure side on the outside of the tube. This allows the pressure applied by the gas on the outside to be distributed over the porous support layer 148, and the porous structure allows for gas transport. After fabrication of the supported electrolyte structure, electrodes 142 and 144 are infiltrated into the porous support structure on both sides of the electrolyte and fired to the appropriate temperature for good adhesion.

Although the illustrated embodiment of FIG. 3A shows the membrane 144 disposed on the outer surface of a supportive cylindrical structure 148, in some embodiments, the cylindrical support structure 148 may be used as the electrolyte between the inner and outer electrodes 142 and 146. Hence, the inner electrode 146 may be disposed in contact with an inner surface of the tubular structure 148, and the outer electrode 142 may be disposed in contact with the outer surface of the tubular structure 148. In these embodiments, the tubular structure 148 acts as the oxygen ion conducting membrane 144, so no additional layers are required. Other embodiments may be implemented with different arrangements of the layers.

Figure 3B:
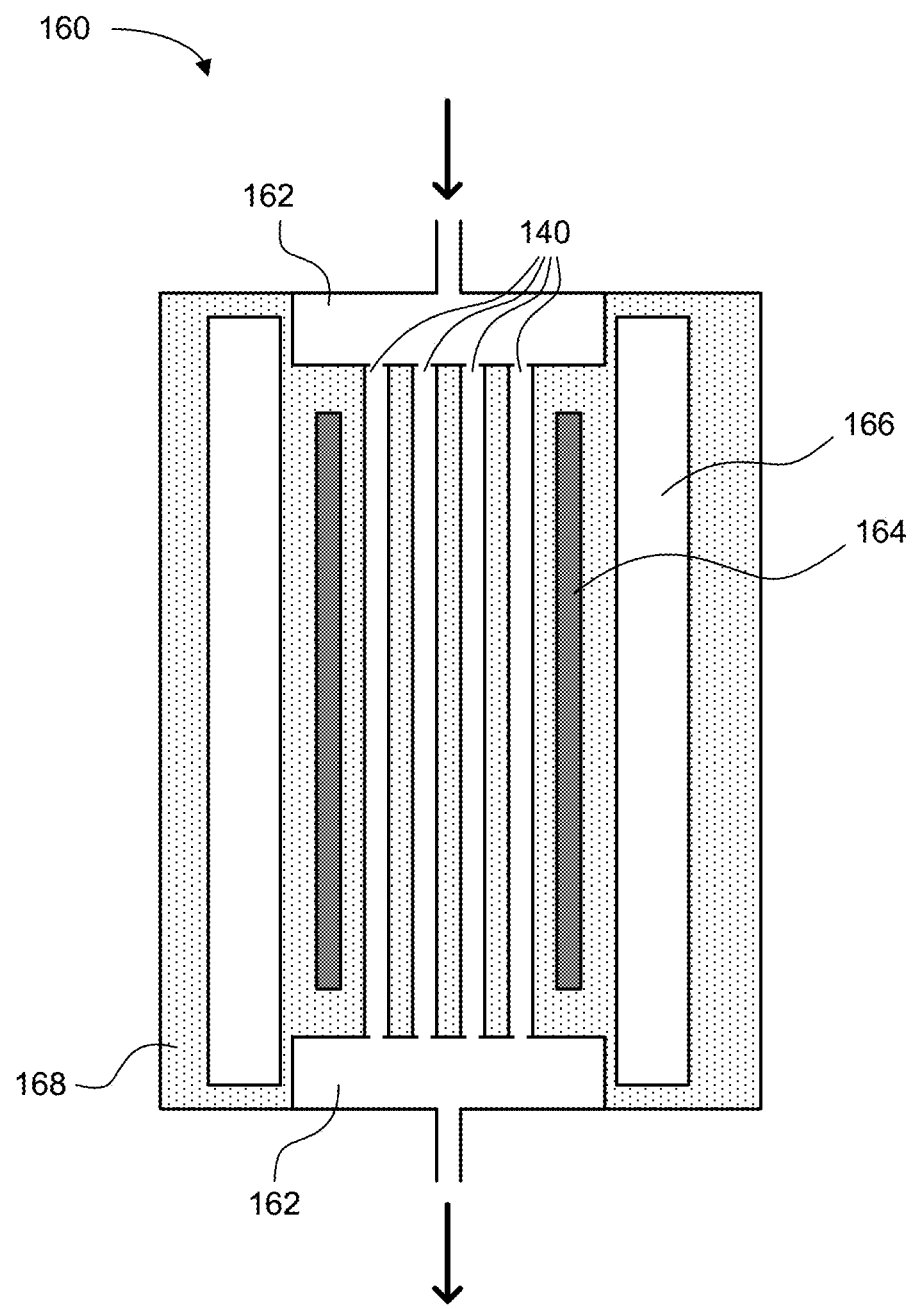
FIG. 3B depicts a schematic diagram of one embodiment of an electrochemical oxygen pump with a bank of tubular structures.

FIG. 3B depicts a schematic diagram of one embodiment of an electrochemical oxygen pump module 160 with a bank of tubular structures 140. In some embodiments, modules 160 can be constructed with multiple tubes 140 connected to manifolds 162. By using multiple modules, the system 120 may be scaled up for larger sized systems. Tubes can also be constructed with larger diameters and length to increase membrane area. Additionally, tubes may be fabricated with different cross-sectional geometries. This tubular approach makes embodiments of the electrochemical oxygen pump module 160 intrinsically scalable across a wide range of power levels from watts (e.g., single tubes), kilo-watts (modules with multiple tubes) and mega-watts (systems with multiple modules). Each module could have self-contained heating systems 164, insulation 166, vacuum pumps and air blowers (see FIG. 2). In some embodiments, they could be connected to a common oxygen storage tank, or may have separate tanks with each module.

In one embodiment, the electrolyte material for the electrochemical oxygen pump is a cerium oxide based oxygen ion conductor. In some embodiments, the dopant in the cerium oxide could be calcium, scandium, gadolinium, etc., to provide improved oxygen ion conduction. In some embodiments, the electrolyte material is a doped zirconium oxide or bismuth oxide based electrolyte material.

In embodiments, that utilize a cerium oxide based electrolyte material the temperature of operation for the electrochemical cell is in the range of 500-900° C., and preferably in the range of 600-750° C. Other embodiments may operate in another temperature range.

In embodiments, that utilize a cerium oxide based electrolyte material the applied voltage during the charging cycle is in the range of 0.01-1.80 VDC, and preferably in the range of 0.1-0.5 VDC. Other embodiments may operate in another temperature range.

In embodiments, that utilize a zirconium oxide based electrolyte material the temperature of operation for the electrochemical cell is in the range of 600-1000° C., and preferably in the range of 650-850° C. Other embodiments may operate in another temperature range.

In embodiments, that utilize a zirconium oxide based electrolyte material the applied voltage during the charging cycle is in the range of 0.01-2.20 VDC, and preferably in the range of 0.1-0.5 VDC. Other embodiments may operate in another temperature range.

In embodiments, that utilize a bismuth oxide based electrolyte material the temperature of operation for the electrochemical cell is in the range of 400-800° C., and preferably in the range of 550-650° C. Other embodiments may operate in another temperature range.

In embodiments, that utilize a bismuth oxide based electrolyte material the applied voltage during the charging cycle is in the range of 0.01-1.50 VDC, and preferably in the range of 0.1-0.5 VDC. Other embodiments may operate in another temperature range.

In some embodiments, the electrolyte material thickness is in the range of 1-300 µm, and preferably in the range of 10-100 µm thickness. Other embodiments may be fabricated with another thickness of electrolyte material.

In some embodiments, the electrode materials are perovskite structured semi-conducting oxide ceramic materials. Some examples are provided here, but with the understanding provided herein one skilled in the art will understand that a wide variety of electrically conductive oxide ceramic materials will work in this application. Some examples include, but are not limited to, lanthanum strontium manganite (one example being $La_{0.7}Sr_{0.3}MnO_3$), lanthanum strontium cobaltite (one example being $La_{0.7}Sr_{0.3}CoO_3$) and lanthanum strontium chromite (one example being $La_{0.7}Sr_{0.3}CrO_3$).

In one embodiment, an electrically conductive and catalytically active metal may be added to the perovskite electrode material forming a composite electrode material to improve oxygen oxidation/reduction kinetics in addition to increasing overall electrical conductivity of the composite electrode material. Potential metals to add to the perovskite material include but are not limited to, silver, silver alloys (Ag—Pd, Ag—Pt, Ag—Cu, etc.), Pd and Pd alloys, Pt and Pt alloys, etc. In one embodiment the added metal/metal alloy is in the range of 10-80 vol %, and preferably in the range of 30-50 vol %.

In some embodiments, an additional current collector (not shown) is added to one or both of the electrodes to improve efficiency by lowering ohmic losses present in the electrode material. In one embodiment, this current collector material is a silver or silver alloy material (e.g., Ag, Ag—Pd, Ag—Pt, etc.).

Some embodiments include a high pressure storage tank 168 to contain the pressurized oxygen during the energy storage cycle (charging). In one embodiment, the same housing that is used for the electrochemical oxygen pump module 160 may also be used as the pressure storage tank 168.

The pressure range for the high pressure oxygen storage is in the range of 0.1-200 atmospheres (atms), and preferably in the range of 5-50 atms. Other embodiments may operate in other pressure ranges. In some embodiments the volume of the tank is adjusted depending upon the size of the energy storage system.

Performance modeling of an embodiment of an energy storage system can be used to demonstrate feasibility at the mega watt scale. The analysis indicates how the oxygen pressure and voltage/power will vary during a 1.0 hour charging cycle and during a 2.5 hour discharge cycle.

The inputs for the performance modeling are provided below in Table 1. The outputs of the performance modeling are provided below in Table 2.

TABLE 1

Inputs for performance modeling of a megawatt scale energy storage system.

| Module Parameters (Inputs) | |
|---|---|
| No of Tubes/module | 50 |
| Tube length | 1.25 m |
| Tube Dia | 2 inches |
| Membrane Thickness | 25 microns |
| Max Current Density | 1 A/cm$^2$ |
| Membrane Temperature | 1023 K |
| Pressurization Cycle (Energy Storage) | |
| No of Operating Modules | 250 |
| Initial PO2 | 10 atm |
| Maximum PO2 | 30 atm |
| Pump Cell Voltage | 0.25 V |
| Charge Time | 1 hour |
| Power Cycle (Electricity Supply) | |
| Vacuum O2 Partial Pressure | 1.00E−04 atm |
| No of Operating Modules | 250 |
| Load Multiplier | 10 |
| Discharge Time | 2.65 hour |
| System Parameters | |

TABLE 1-continued

Inputs for performance modeling of a megawatt scale energy storage system.

| | | |
|---|---|---|
| Module O2 Chamber Vol | 1000 | m^3 |
| Pressure Vessel Side | 10 | m |

TABLE 2

Outputs from performance modeling of a megawatt scale energy storage system.
Outputs

| | | |
|---|---|---|
| Average Output Electrical Power | 1024 | kW |
| Average Input Electrical Power | 3220 | kW |
| Total Input Electrical Energy | 3005 | kWh |
| Total Output Electrical Energy | 2735 | kWh |
| Cycle Efficiency | 91% | |
| Storage Cycle Starting Pressure | 10.0 | atm |
| Storage Cycle Ending Pressure | 12.5 | atm |
| Elec Supply Cycle Ending Pressure | 10.0 | atm |
| Membrane Resistance/Tube | 0.00007 | Ohms |
| Membrane Conductivity | 0.01891 | S/cm |
| Membrane Area/Tube | 0.199 | m^2 |
| Membrane Thickness | 0.000025 | m |
| Gas Constant - R | 8.314 | J/mol/K |
| Air O2 Concentration | 21% | |
| Ambient Air Pressure | 1 | atm |
| O2 chamber Volume | 1000 | m^3 |
| Elec. Power for Blower/Pre-Heat | 173.1 | kWh |
| Elec. Power for Vacuum Pump | 107.9 | kWh |
| Max Allowed Current/Cell | 1995 | Amps |
| Max Current per Cell (storage) | 979 | Amps |
| Max Current per Cell (supply) | 355 | Amps |
| Voltage (Storage Cycle) | 3125 | Volts |
| Max Voltage (Supply Cycle) | 3232 | Volts |

Figure 4A:
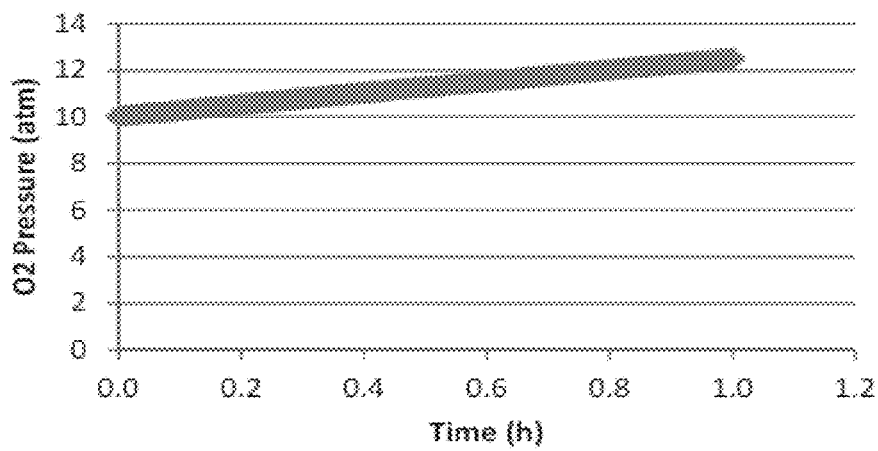
FIG. 4A depicts a graph of one embodiment of oxygen pressure increasing over an energy storage cycle.
Figure 4B:
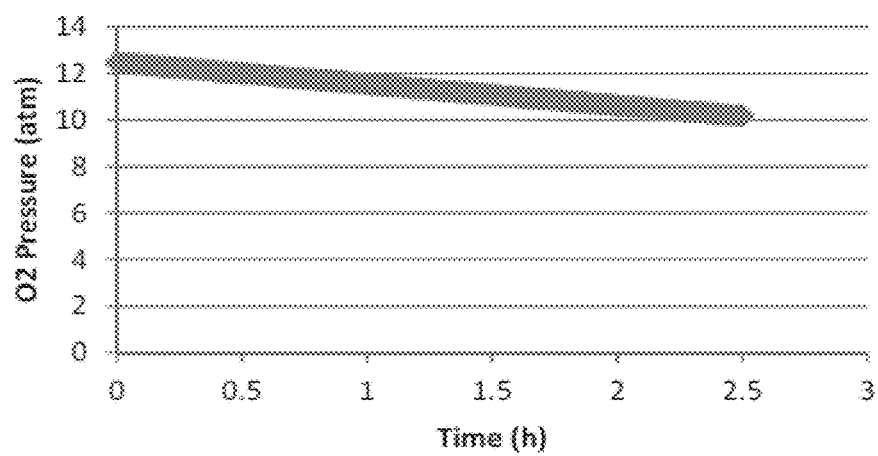
FIG. 4B depicts a graph of one embodiment of oxygen pressure decreasing over an energy discharge cycle.

FIG. 4A depicts a graph of one embodiment of oxygen pressure increasing over an energy storage cycle. In particular, the pressure of the oxygen in the storage chamber increases from about 10 atm to about 12.5 atm over a 1 hour storage period. During this time, electrical energy is used to increase the pressure of the oxygen inside the pressurized chamber FIG. 4B depicts a graph of one embodiment of oxygen pressure decreasing over an energy discharge cycle. In particular, the pressure of the oxygen in the storage chamber decreases from about 12.5 atm to about 10 atm over a 2.5 hour discharge period. During this discharge period, electricity generated by the system may be directed to a device or load that can productively consume the electrical energy.

Figure 5A:
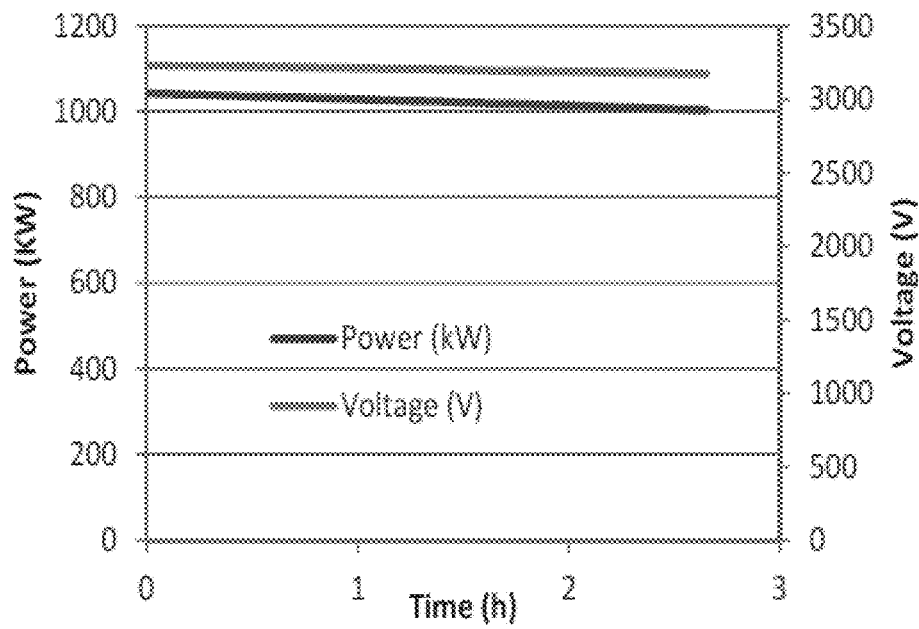
FIG. 5A depicts a graph of one embodiment of output power and voltage from the modeled system over the energy discharge cycle.
Figure 5B:
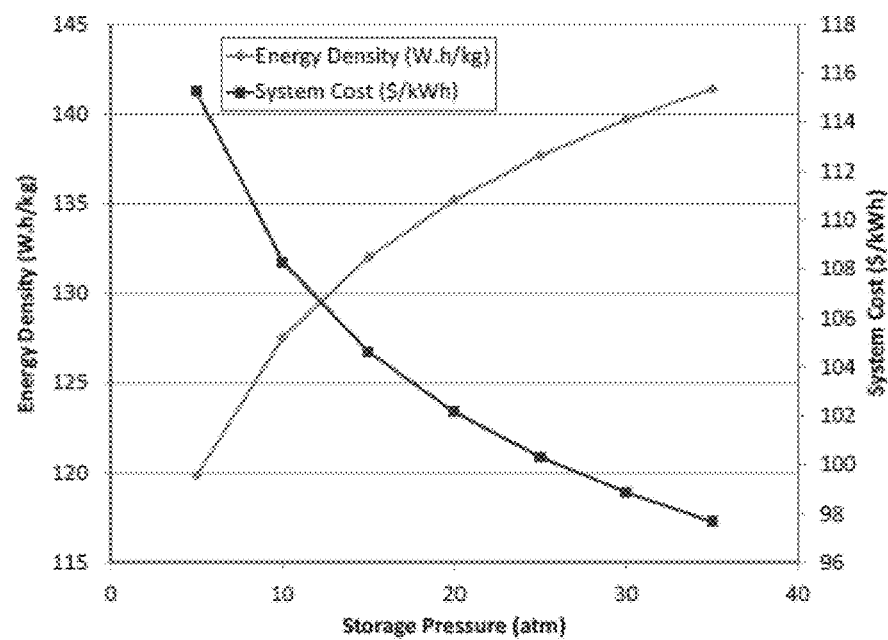
FIG. 5B depicts a graph of one embodiment of energy density and system capital costs of the modeled system as a function of operating pressure.

The results illustrated in FIGS. 5A and 5B suggest that costs under $100/kWh are feasible. In particular, FIG. 5A depicts a graph of one embodiment of output power and voltage from the modeled system over the energy discharge cycle. FIG. 5B depicts a graph of one embodiment of energy density and system capital costs of the modeled system as a function of operating pressure.

In some embodiments, it is expected that performance of energy storage systems described herein can deliver cycle efficiencies approaching 90%.

Based on architectures similar to solid oxide fuel cells and ITM oxygen separation systems which have both been shown to have capital costs under $600/KW, embodiments with long design life, high cycle lifetimes and high efficiency combine to deliver energy costs under $100/kWh.

Embodiments of an installed system may only require electric power and air, and may not require water or fuel. This makes it possible to use the system virtually anywhere.

Embodiments of the system can be always-on solutions that can rapidly react to instantaneous demand.

Embodiments of the systems can also be designed to react to discharge faster or slower by turning on more or less stacks during the electric power delivery cycle. The modular nature of embodiments of the technology allows demonstration at a relatively small scale to be transferred with high fidelity to scaled-up systems at the megawatt scale.

Embodiments of the system and technology may have a number of key advantages that give it the potential to be the dominant technology of choice for energy storage from grid-connected renewable energy sources. Some embodiments will allow grid operators to meet an increasing challenge within the grid scale power generation market to balance power generation with load demand as a function of time. Balancing generation and load can be costly in terms of capital life expectancy and operational inefficiencies. Incorporating energy storage within the grid infrastructure can have a broad range on impacts industry wide. The most common example is "load leveling" where low cost energy produced during times of low demand can be stored and later used during times of peak demand when the cost of energy generation is greatest.

Additionally, as intermittent renewable energy sources increase their contribution to overall power production, energy storage becomes even more critical to alleviate issues with time shifting related to when power is produced and used. The ability to store excess generated power can also have huge savings on the cost associated with construction of new power generation capacity. Energy producers must have sufficient capacity to provide dependable power during periods of high demand irrespective of how short that time period is. Reliable energy storage can eliminate the need for expensive capital equipment upgrades that would otherwise be necessary to meet the demands during these short time intervals.

Along these same lines, congestion at both transmission and distribution points within the grid can be significantly reduced by incorporating energy storage within the system. This can result in more regulated voltage and frequency within a narrower range which is a requirement for the production of high quality power. In today's economy with ever increasing critical electronic and computer systems being ubiquitous, the quality of the delivered power is becoming increasingly important for uninterrupted operation.

Specific system variables may be adjusted or optimized for a particular system. Some potential considerations and trade-offs of specific variables are considered below.

1. Membrane temperature: A higher membrane temperature will reduce the energy required for electrochemical energy storage due to the reduced membrane resistance and reduced electrode overpotentials. However, a higher temperature will require greater system cost for safety and sealing, and a greater amount of energy will be required to maintain the temperature.

2. Operating pressures in the oxygen storage tank: Higher pressures in the oxygen storage tank will increase the voltage output during the energy discharge cycle, but will require a higher input energy to pressurize to the target pressure and will require the membrane to withstand the greater pressure.

3. Membrane thickness: A lower membrane thickness will result in lower ohmic losses during both the storage cycle and the energy discharge cycle. This will need to be balanced against the complexity (or added cost) of fabricating defect free dense membranes. A secondary effect of having less ohmic losses is that additional heat energy may need to be provided for maintaining the temperature.

4. Membrane area: In general, a greater membrane area will allow for more oxygen to be pumped in and out for a given power level due to the lower cell resistance. However, this will need to be balanced against greater wall thickness needed for greater diameter tubes and lower reliability of longer tubes.

5. Air-side pressure during energy discharge cycle: Use of a vacuum pump allows pressures on the air side during the discharge cycle of $10^{-2}$ to $10^{-4}$ atm, which can result in a difference in the supply voltage per cell (lower pressure, higher supply voltage), and correspondingly the potential for higher power density. However, this has to be balanced against the greater power requirement of a pump needed to pump down to such a low pressure.

6. Number of active modules in storage and supply cycles: By controlling the number of modules that need to be active during the charging or discharging cycles, the peak power draw can be adjusted (traded off against discharge time).

7. Storage volume: The $O_2$ storage volume affects the magnitude of the pressure, the rate of change of pressure and the energy storage capacity (assuming the max pressure is capped). The magnitude of pressure affects the supply voltage and therefore has an effect on instantaneous power.

Different embodiments of the systems described herein may be implemented in different types of commercial markets. One implementation includes grid-scale energy storage to meet peak electricity demand. This is by far the biggest market segment for energy storage today and dominated by traditional pumped storage installations, which all provide load-leveling and peak-shifting services addressing the most basic challenge for a grid operator: matching generation and load.

Another implementation includes commercial buildings. Energy storage can be used to reduce energy costs by offsetting demand requirements by storing electric power from the grid during low demand times. Storage can also be an attractive option for businesses that need steady high quality power (e.g. the semiconductor industry).

Customer requirements in the different segments are different, but related. These requirements can ultimately be distilled down to predictability and reduction of life-cycle costs, which in turn can be broken down into initial installation/purchase costs and recurring operating costs. The reduction of installation costs translates to the following technical requirements for the system:

1. Should not require customization (beyond modular scale up) for specific sources/locations.
2. Should not utilize any supply-limited materials.
3. Should possess high power density
4. Should not require any on site manufacturing or any heavy construction The requirement to reduce operating costs translates to the following technical requirements:

1. Should not require any consumables for operation (e.g. fuels, water)
2. Should operate for a large number of charge/discharge cycles without failure (e.g. 25,000 cycles)
3. Should not produce any toxic or hazardous waste or regulated emissions.

There is no single solution for energy storage today that can provide all of the requirements for grid-scale energy storage systems including sufficiently low costs, high efficiency, sufficiently high power density, extreme reliability and lifetime, long discharge cycles, no heavy construction requirements, no water disposal issues, and non-requirement of any consumables or fuels, as the embodiments disclosed herein have the potential to do. This combination of clear-cut benefits differentiates it clearly from the best available solutions today—namely pumped hydro (which requires water, and very heavy on-site construction), or rechargeable batteries (which have generally low power densities, high costs, have limited lifetime and pose disposal issues).

Examples of conventional energy storage technologies in development include flywheel based (e.g. Beacon Power and Boeing), magnetic energy storage (e.g. ABB), flow batteries (e.g. United Technologies, CUNY Energy Institute, General Atomics, Lawrence Berkeley National Laboratory, Primus Power), rechargeable batteries (e.g. Fluidic Energy, University of Southern California), compressed air storage (e.g. General Compression, LightSail Energy) and regenerative fuel cells (Proton Energy Systems). While some specific approaches proposed for compressed air storage, which do not require any additional fuel and are used to drive an "air turbine," may share some of the basic advantage of embodiments of the HOPES approach that no other resource other than ambient air is needed, compressed air storage systems are expected to be much less efficient due to the inherent inefficiencies of air compressors, and air-driven turbines. Fuel-cell driven fuel conversion/storage systems such as electrolysis systems require water or some other resources/inputs generally. While such approaches may indeed be suitable for specific locations where these resources are readily available due to their intrinsically higher power density comparable with embodiments of the HOPES system, embodiments of the HOPES system can be used virtually anywhere that renewable power is generated including very remote locations. Further, the cost of the consumed resource must also be factored in when doing a comparison of the overall cost of storage with these fuel-production based storage systems relative to embodiments of the HOPES system.

Embodiments of the HOPES technology offer customers (i.e., electric utilities) a number of key advantages that can be translated into value for their customers (i.e. electricity consumers) in the form of inexpensive, highly reliable electricity. This unique combination of benefits, listed below, can make the HOPES technology the dominant technology of choice for energy storage from grid-connected renewable energy sources.

1. Embodiments of the HOPES technology can deliver cycle efficiencies approaching 90%.
2. Based on architectures similar to SOFCs and ITM oxygen separation systems which have both been shown to have capital costs under $600/KW, its long design life, high cycle lifetimes and high efficiency combine to deliver energy costs well under $100/kWh, significantly lower than competing options.
3. The system only requires electric power and air, and not water or fuel, making widely deployable.
4. HOPES systems can be designed to be always-on and can rapidly react to instantaneous demand.
5. The systems can also be designed to discharge faster or slower by turning on more or less stacks during the electric power delivery cycle.
6. The modular nature of the technology allows demonstration at a relatively small scale to be transferred with high fidelity to scaled-up systems at the MW scale.

Additional Embodiments (1) Use of ICMs in combination with an energy generation source, and in particular a renewable energy generation source, to store pressurized oxygen using electrical energy generated by the source.

(2) Use of the stored compressed oxygen to drive a solid-state electrochemical power generator to supply electricity, especially in times of high electricity demand on the grid.

(3) Specific device configurations (e.g. tubular and planar) for use in this particular application.

(4) System level details (thermal management through controlled $i^2R$ heating, vacuum pump operation, charge/discharge cycle management etc) for this particular application.

Additional Concepts.

(1) Specific details of membrane and/or support architecture needed for the high pressure differentials.

(2) Electrode and interconnect configurations for optimal performance and lowest cost.

(3) Membrane fabrication concepts that allow the attainment of very high efficiency operation.

In some embodiments described herein, the system includes a switch to reverse the direction of the current through the membrane. The current may be supplied to the membrane in order to drive storage of the oxygen into a storage tank.

Alternatively, the stored oxygen may be allowed to pass through the membrane, resulting in a current supplied from the membrane to a connected load. The references to switching and/or a switch generally refer to the ability to change the direction of the current relative to the membrane. The specific locations of one or more switches, and the possible types of switching technologies (e.g., hardware, software-controlled, etc.) may vary from one embodiment to another. More generally, embodiments may incorporate other mechanisms to directly or indirectly change the direction of the current relative to the membrane.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An electrical energy storage device comprising:
    a membrane comprising an oxygen ion conducting material;
    an electrical circuit coupled to electrodes of the membrane, wherein the electrical circuit is configured to operate in at least two modes, wherein a first mode comprises an energy storage mode and a second mode comprises an energy discharge mode;
    a storage chamber configured to store oxygen at a partial pressure higher than that of ambient air; and
    a channel to direct oxygen pumped from the membrane to the storage chamber during the energy storage mode;
    wherein the membrane is configured in the energy storage mode to transport oxygen ions through the membrane in a first direction from ambient air to the storage chamber in response to an electrical potential applied across the membrane; and
    wherein the membrane is configured in the energy discharge mode to transport oxygen ions through the membrane in an opposite direction to generate electrical current and make the electrical current available to the electrical circuit in response to an oxygen partial pressure differential applied across the membrane.

2. The electrical energy storage device of claim 1, wherein the oxygen ion conducting material comprises one or more of doped zirconia, doped ceria, bismuth oxide, or a perovskite based material.

3. The electrical energy storage device of claim 1, where the electrodes are disposed on one or both sides of the membrane.

4. The electrical energy storage device of claim 1, further comprising:
    a storage chamber to store oxygen at a partial pressure higher than that of ambient air; and
    a channel coupled between the storage chamber and the membrane, wherein the channel is configured to direct the oxygen from the storage chamber through the membrane to the ambient air or to air at a lower pressure than ambient created by a vacuum pump during the energy discharge cycle.

5. The electrical energy storage device of claim 1, where the membrane is tubular or planar.

6. The electrical energy storage device of claim 1, further comprising a porous structural member coupled to the membrane, wherein the porous structural member is in mechanical contact with, or sintered to, a first side of the membrane that experiences a lower gas pressure relative to an opposite second side of the membrane, wherein the a porous structural member is configured to bear mechanical stresses and prevent failure of the membrane due to the oxygen partial pressure differential across the membrane.

7. The electrical energy storage device of claim 1, wherein the membrane is further configured to operate at a first temperature between 300-1200° C. or at a second temperature between 500-800° C.

8. The electrical energy storage device of claim 1, wherein the membrane has a thickness between 0.1-1000 micrometers or between 1-25 micrometers.

9. The electrical energy storage device of claim 1, wherein the membrane and electrodes are tubular, and the electrodes are concentrically disposed on either side of the membrane, and further comprising a porous structural member coupled to at least one surface of one of the electrodes to provide structural support to the membrane and the electrodes.

10. A method of storing energy, wherein the method comprises:
    applying an electrical potential across a membrane comprising an oxygen ion conducting material during an energy storage cycle;
    transporting oxygen through the membrane and through a channel to move oxygen from ambient air to a storage chamber during the energy storage cycle;
    subsequent to the energy storage cycle, applying an oxygen partial pressure differential across the membrane during an energy discharge cycle;
    transporting oxygen ions in an opposite direction through the membrane during the energy discharge cycle; and generating an electric current in at least one electrical circuit electrically connected to the membrane during the energy discharge cycle.

11. The method of claim 10, wherein the oxygen ion conducting material comprises one or more of doped zirconia, doped ceria, bismuth oxide, or a perovskite based material.

12. The method of claim 10, further comprising switching an electrical connection to switch between the energy storage cycle and the energy discharge cycle.

13. The method of claim 10, further comprising pumping the oxygen into a storage chamber in which the oxygen is at a partial pressure higher than that of ambient air during the energy storage cycle.

14. The method of claim 10, further comprising pumping the oxygen through the channel from the storage chamber in which the oxygen is at a partial pressure higher than that of ambient air to the ambient air or air at a lower pressure than ambient created by a vacuum pump during the energy discharge cycle.

15. The method of claim 10, wherein transporting the oxygen through the membrane further comprises transporting the oxygen through a tubular or planar membrane.

16. The method of claim 10, further comprising transporting the oxygen through a porous structural member coupled to the membrane, wherein the porous structural member is in mechanical contact with, or sintered to, a first side of the membrane that experiences a lower gas pressure relative to an opposite second side of the membrane, wherein the a porous structural member is configured to bear mechanical stresses and prevent failure of the membrane due to the oxygen partial pressure differential across the membrane.

17. The method of claim 10, further comprising operating the membrane at a first temperature between 300-1200° C. or at a second temperature between 500-800° C.

18. The method of claim 10, wherein the membrane thickness is between 0.1-1000 micrometers or between 1-25 micrometers.

19. A method of converting and storing energy from a renewable energy source, the method comprising:
applying an electrical potential across a membrane comprising an oxygen ion conducting material during an energy storage cycle;
transporting oxygen through the membrane and through a channel to move oxygen from ambient air to a storage chamber during the energy storage cycle;
subsequent to the energy storage cycle, applying an oxygen partial pressure differential across the membrane during an energy discharge cycle;
transporting oxygen ions in an opposite direction through the membrane during the energy discharge cycle;
generating an electric current in at least one electrical circuit electrically connected to the membrane during the energy discharge cycle; and
supplying electrical energy from the electrical circuit to an electrical utility grid for transmission and consumption.

20. The method in claim 19, further comprising:
carrying out at least a portion of the energy storage cycle during a period of low electricity demand below a threshold in the electric grid; and
carrying out at least a portion of the energy discharge cycle during a period of high electricity demand above the threshold in the electric grid.

* * * * *